(12) United States Patent
Ozawa et al.

(10) Patent No.: US 8,515,175 B2
(45) Date of Patent: Aug. 20, 2013

(54) STORAGE MEDIUM, APPARATUS AND METHOD FOR RECOGNIZING CHARACTERS IN A DOCUMENT IMAGE USING DOCUMENT RECOGNITION

(75) Inventors: Noriaki Ozawa, Kawasaki (JP); Hiroaki Takebe, Kawasaki (JP); Yutaka Katsuyama, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 878 days.

(21) Appl. No.: 12/392,798

(22) Filed: Feb. 25, 2009

(65) Prior Publication Data

US 2009/0226089 A1 Sep. 10, 2009

(30) Foreign Application Priority Data

Mar. 4, 2008 (JP) ................................. 2008-054077

(51) Int. Cl.
*G06K 9/18* (2006.01)
(52) U.S. Cl.
USPC .......................................................... 382/185
(58) Field of Classification Search
USPC .......................................................... 382/185
See application file for complete search history.

(56) References Cited

U.S. PATENT DOCUMENTS

| | | | |
|---|---|---|---|
| 5,684,891 A * | 11/1997 | Tanaka et al. | 382/178 |
| 5,949,906 A * | 9/1999 | Hontani et al. | 382/177 |
| 6,332,046 B1 | 12/2001 | Fujimoto et al. | |
| 6,701,015 B2 | 3/2004 | Fujimoto et al. | |
| 2004/0165773 A1 * | 8/2004 | Katsuyama | 382/173 |

FOREIGN PATENT DOCUMENTS

| | | |
|---|---|---|
| JP | 01-303586 | 12/1989 |
| JP | A 04-211884 | 8/1992 |
| JP | 06-124366 | 5/1994 |
| JP | A 11-219407 | 8/1999 |
| JP | A 2000-306045 | 11/2000 |
| JP | 2002-015283 | 1/2002 |

OTHER PUBLICATIONS

Chellapilla and Simard, 2006Chellapilla, K., Simard, P., 2006. A new radical based approach to offline handwritten East-Asian character recognition. Tenth International Workshop on Frontiers in Handwriting Recognition (IWFHR'2006), Oct. 23, 2006, France.*

* cited by examiner

*Primary Examiner* — Nirav G Patel
(74) *Attorney, Agent, or Firm* — Greer, Burns & Crain, Ltd.

(57) ABSTRACT

A program causes a computer to function as a document recognition apparatus, having an extraction unit for extracting connected components of pixels from an input image, a generation unit for generating a reference element that is connected components of pixels extracted by the extraction unit and combined elements obtained by combining the reference element and connected components of pixels adjacent to the reference element as an element to be estimated, a calculation unit for calculating a degree of certainty that indicates how much the element to be estimated generated by the generation unit seems to be a character, and a determination unit for identifying elements that seem to be characters among the elements to be estimated based on the degree of certainty calculated by the calculation unit.

9 Claims, 13 Drawing Sheets

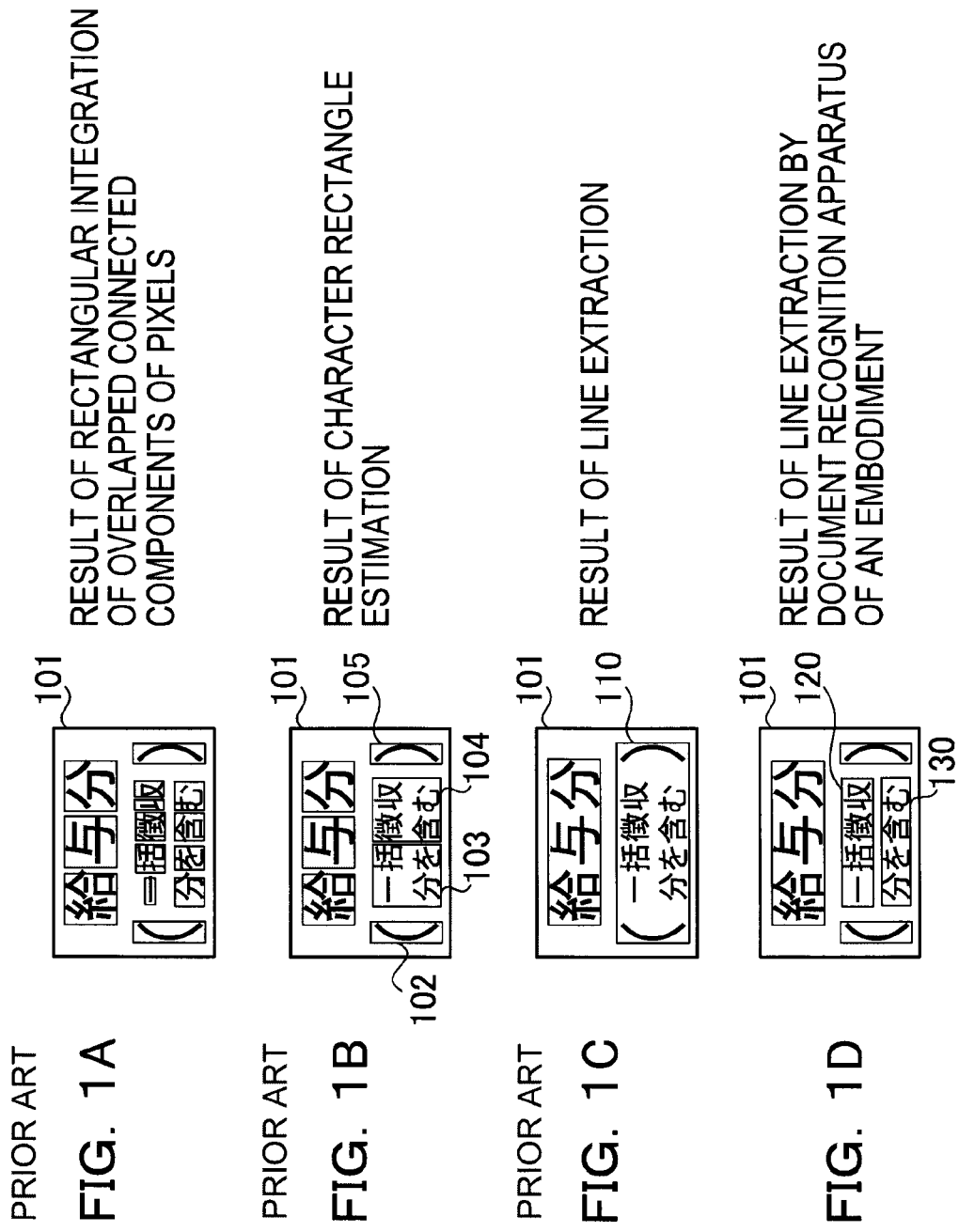

RESULT OF RECTANGULAR INTEGRATION OF OVERLAPPED CONNECTED COMPONENTS OF PIXELS

RESULT OF LINE EXTRACTION

RESULT OF LINE EXTRACTION BY DOCUMENT RECOGNITION APPARATUS OF AN EMBODIMENT

PROCESSING OF CHARACTER ESTIMATION

PROCESSING OF COLUMN EXTRACTION

PROCESSING OF LINE EXTRACTION

FIG. 4B
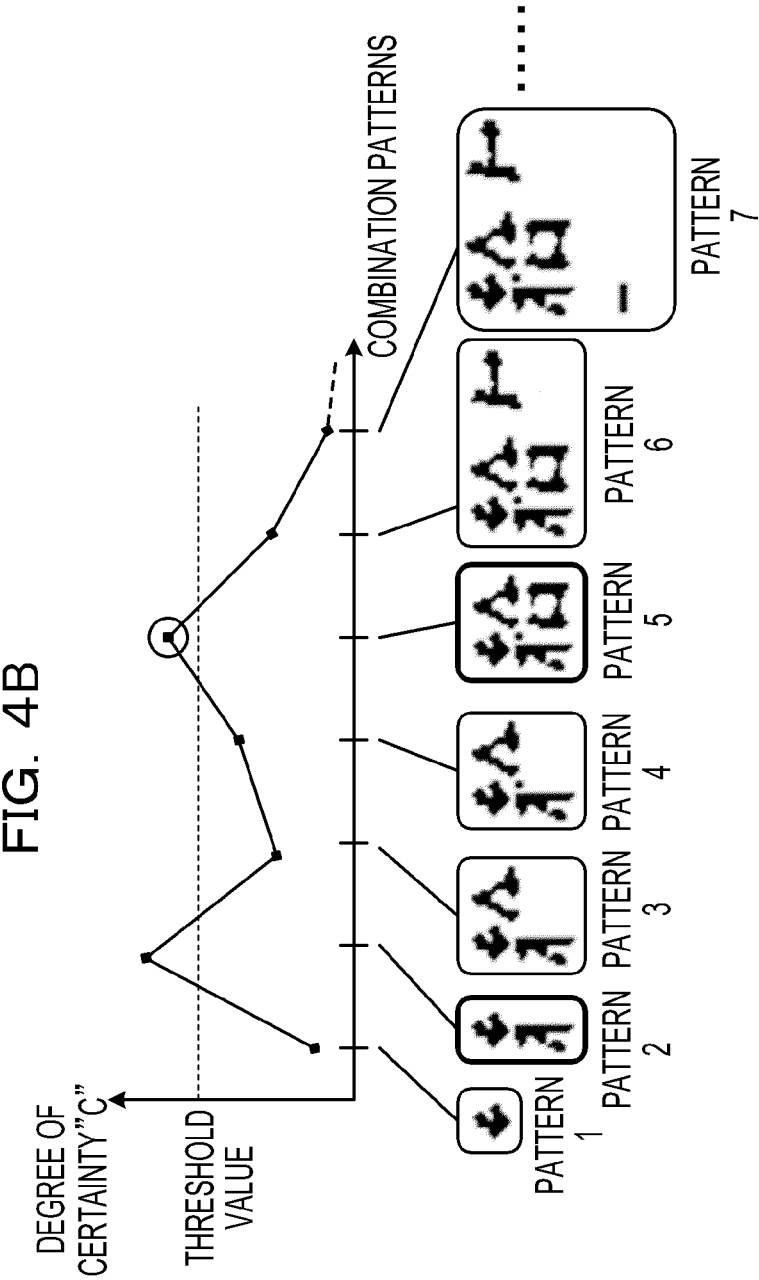
FIG. 4A
FIG. 4C
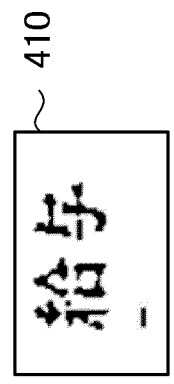

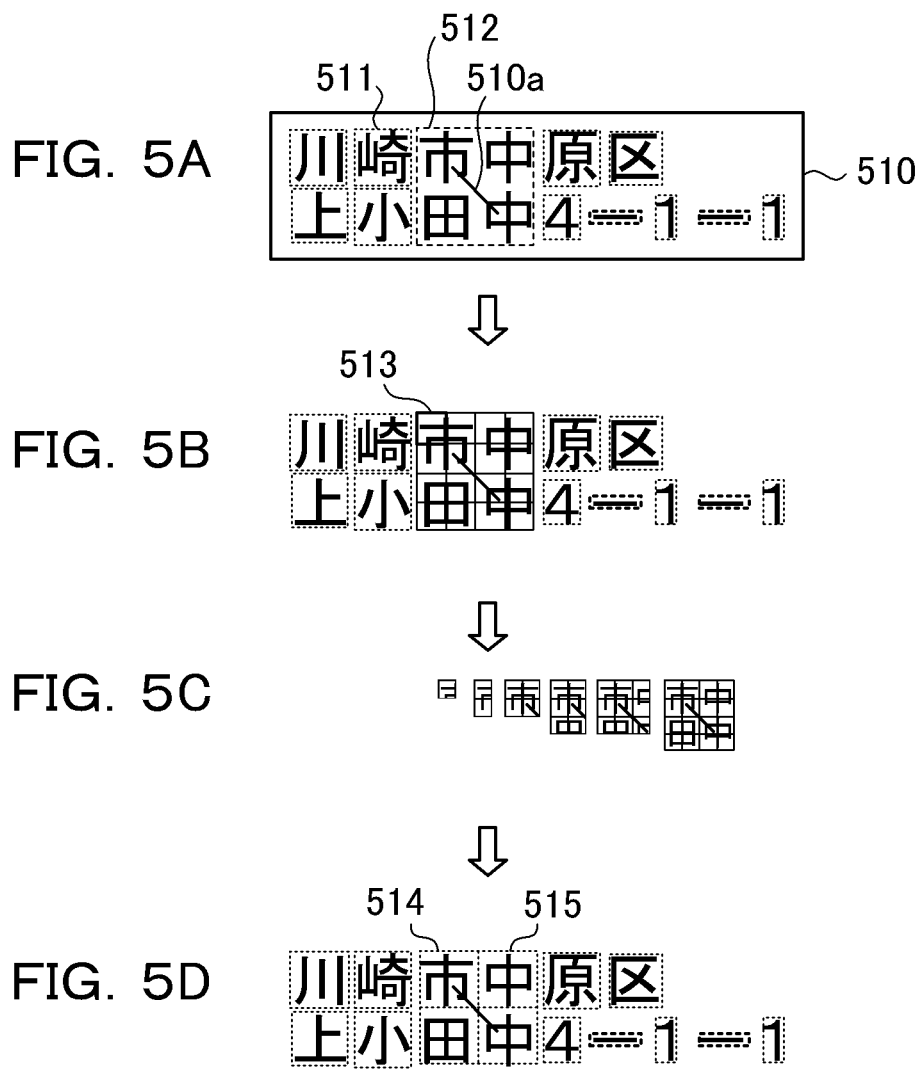

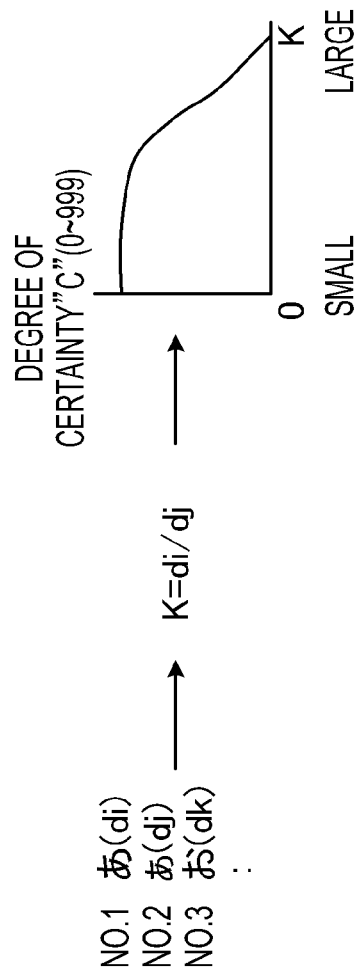
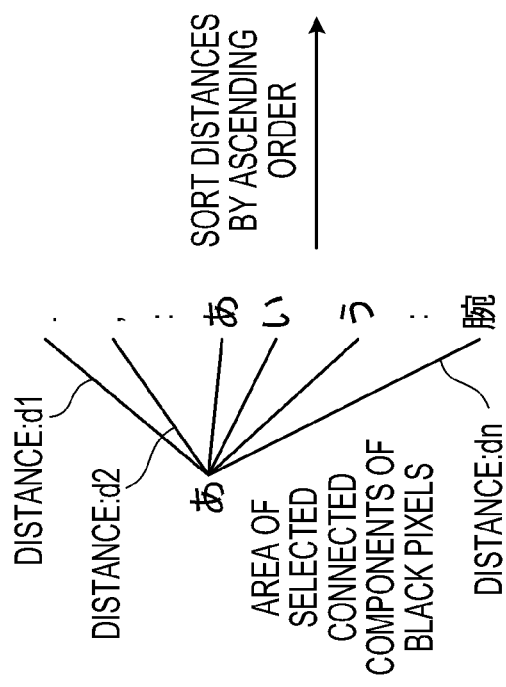
FIG. 6A  FIG. 6B  FIG. 6C  FIG. 6D

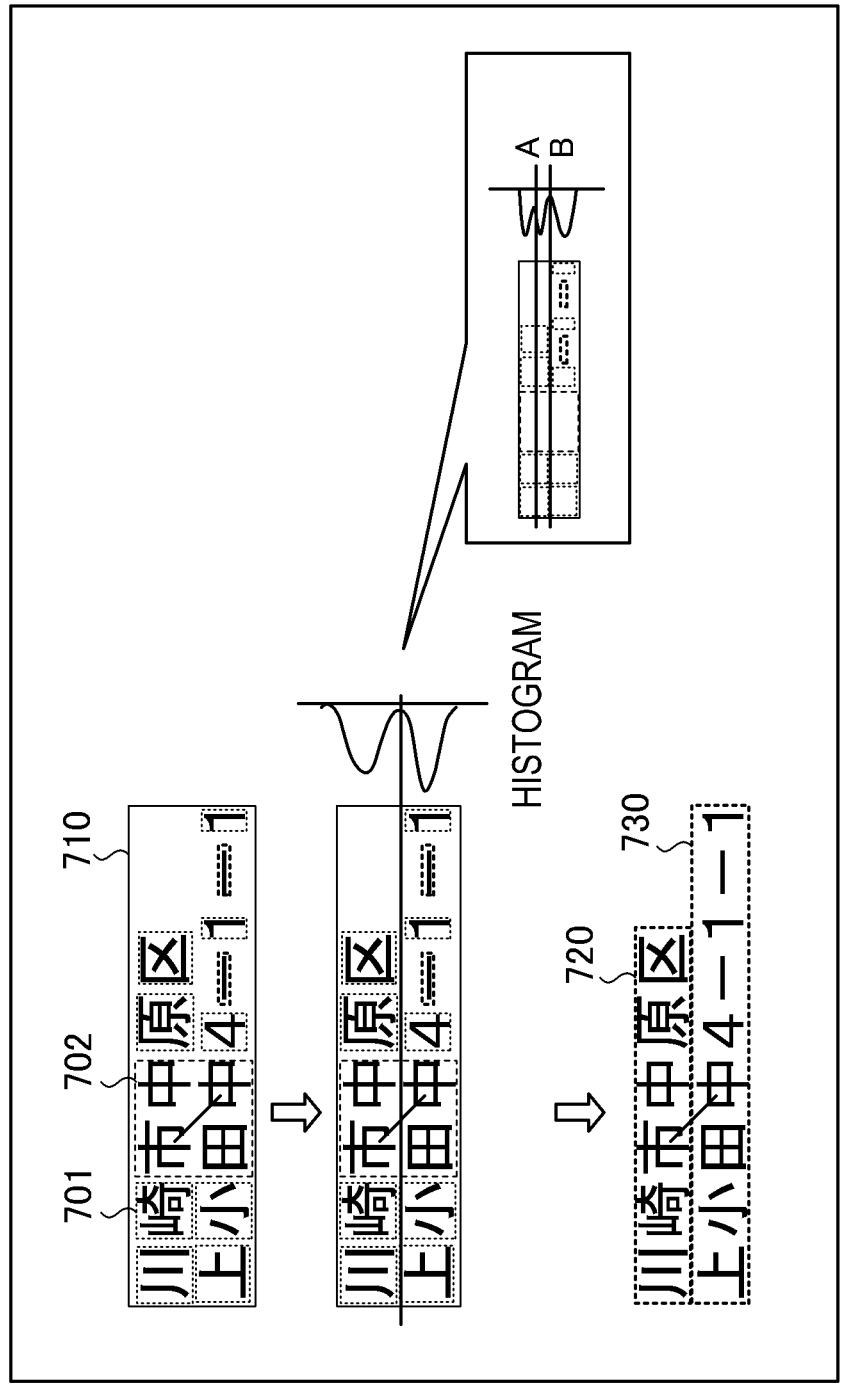

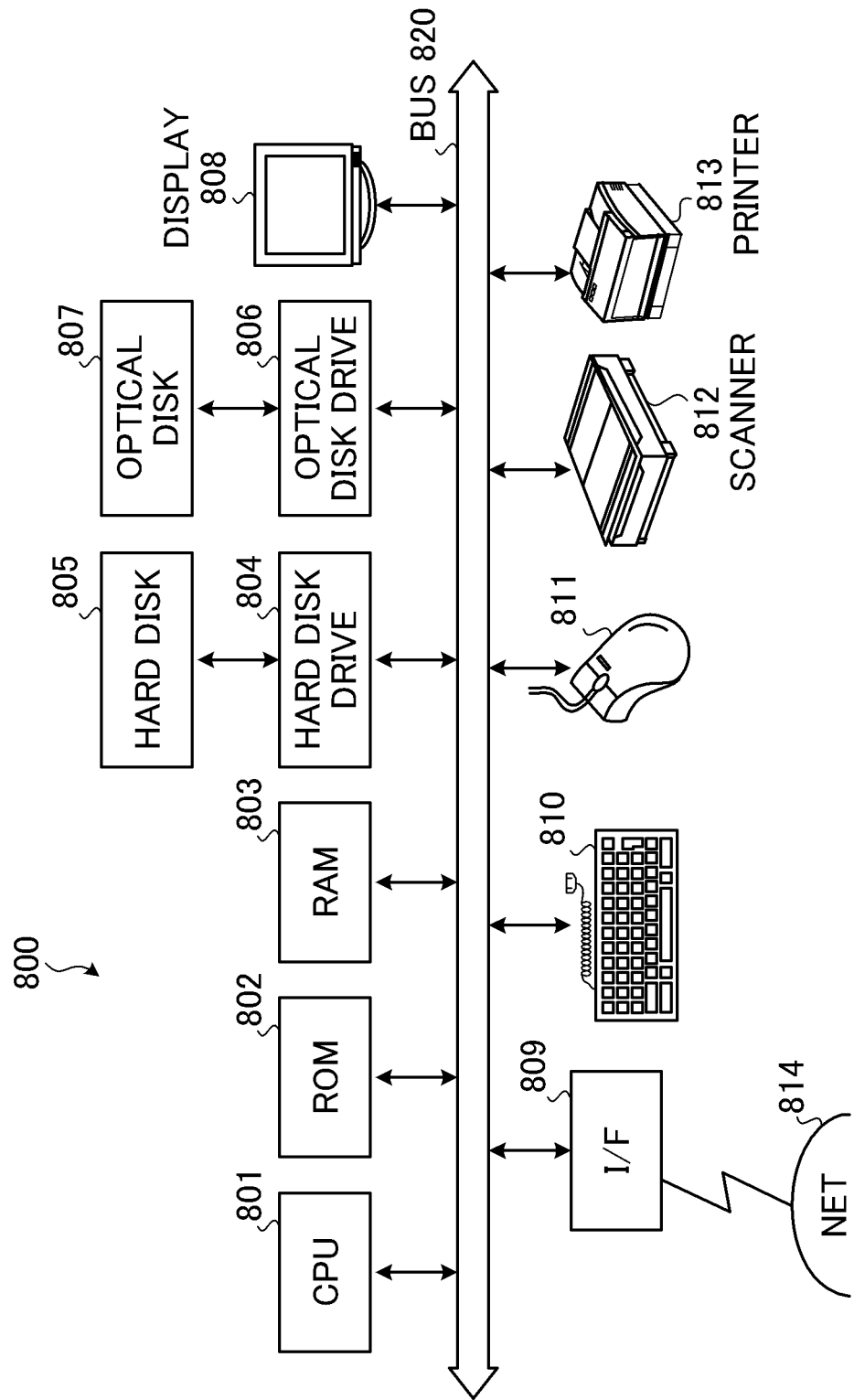

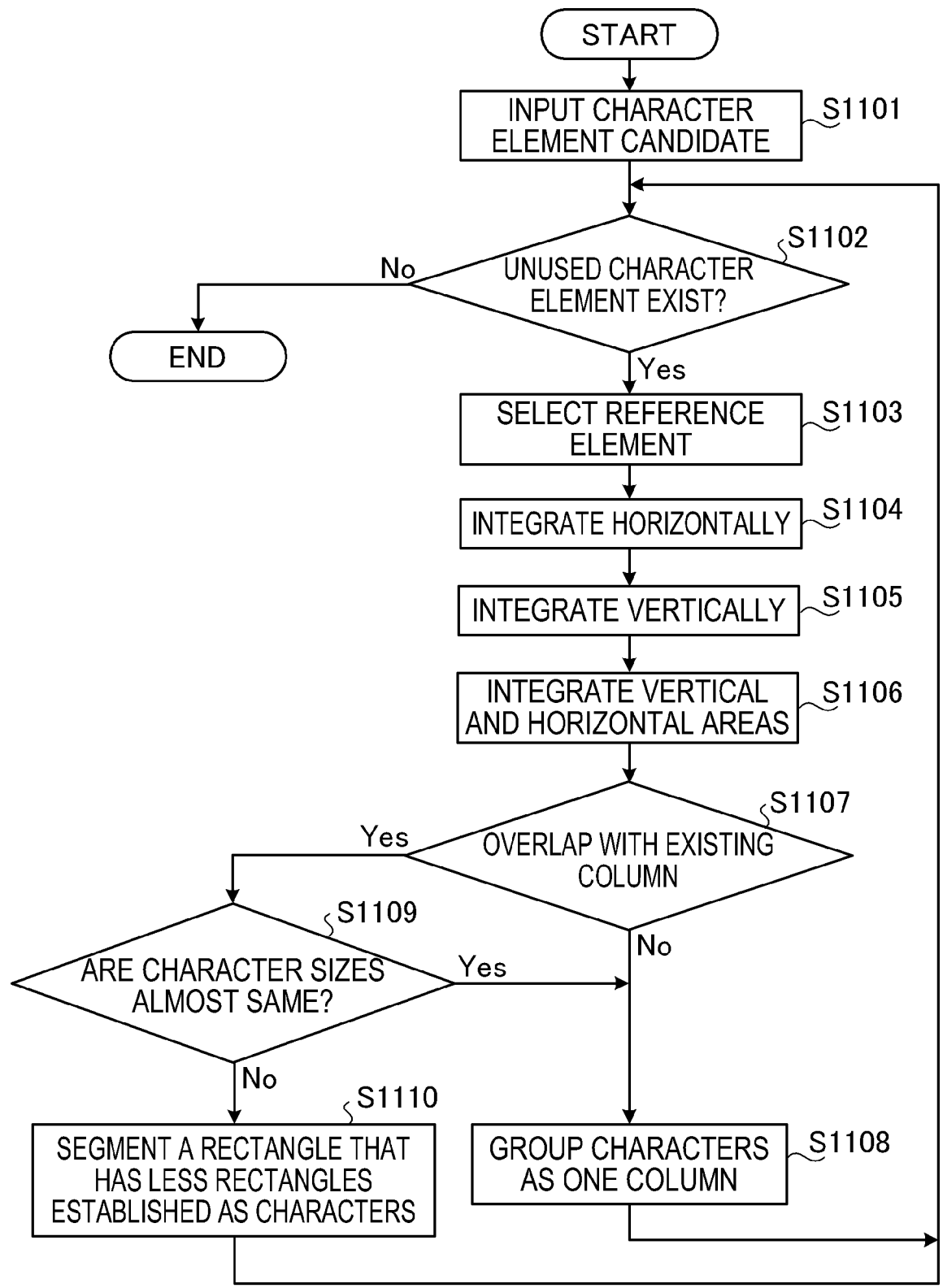

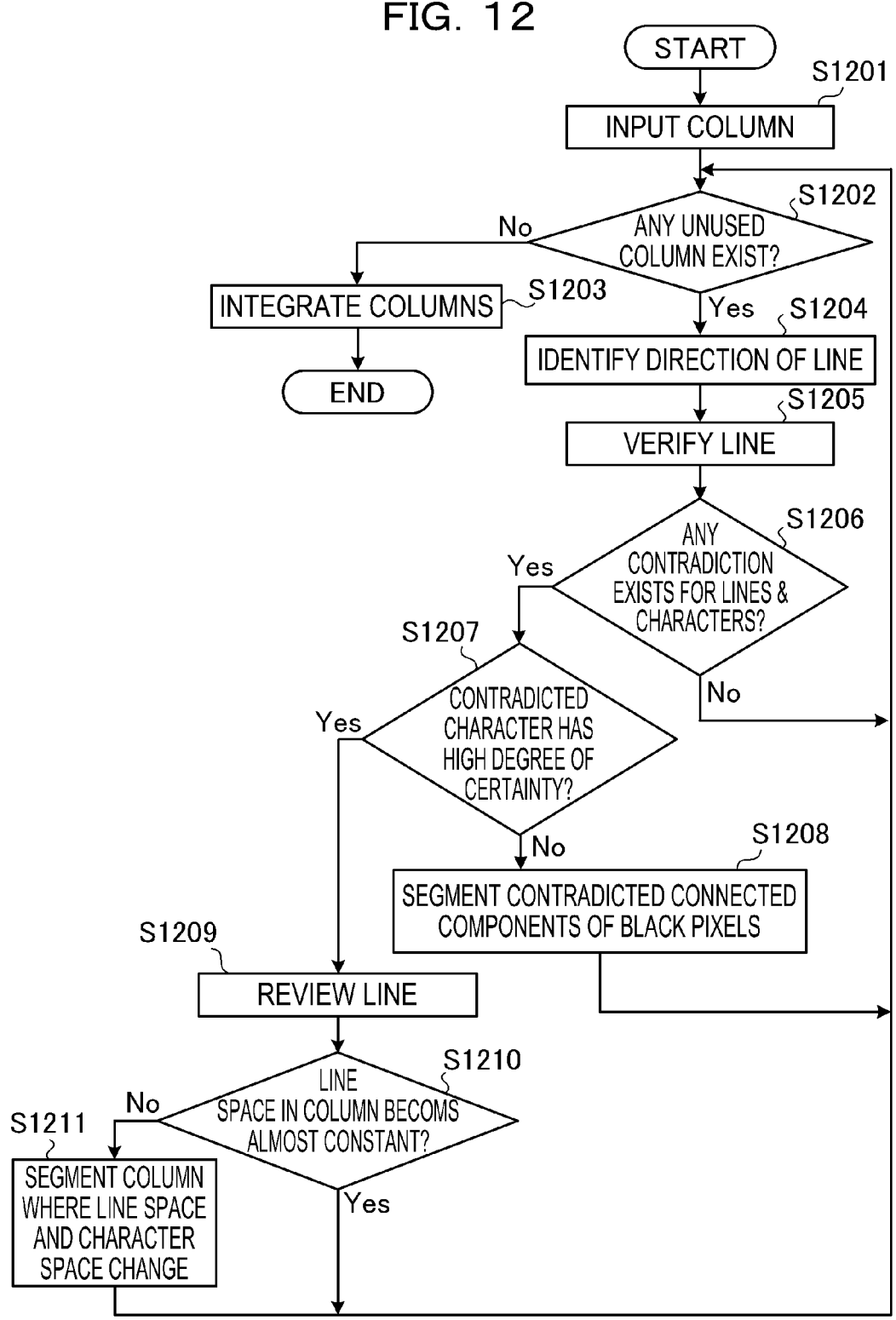

STORAGE MEDIUM, APPARATUS AND METHOD FOR RECOGNIZING CHARACTERS IN A DOCUMENT IMAGE USING DOCUMENT RECOGNITION

CROSS-REFERENCE TO RELATED APPLICATION

This application is based upon and claims the benefit of priority from the prior Japanese Patent Application No. 2008-54077 filed on Mar. 4, 2008, the entire contents of which are incorporated herein by reference.

FIELD

The present invention relates to a storage medium storing document recognition program, a document recognition apparatus, and a method thereof for recognizing a document in an input image by using document recognition.

BACKGROUND

In conventional document recognition, a line is extracted using rectangle information based on "a set of black pixels that seem to be characters" or "a circumscribed rectangle of pixels that seem to be characters." Failure in estimating a size of the circumscribed rectangle may lead to failure in a line extraction, because the estimation of the circumscribed rectangle substantially influences on the appropriateness and inappropriateness in of a line extraction. Thus, technologies using character recognition for evaluating how much likely it is that an object seems to be is a character have been developed.

Japanese Patent No. 3913985 (corresponding English publication is U.S. Pat. No. 6,701,015), for instance, discloses a technology that judges whether objects in an area that includes a noise are character components or not using the number of character components or character recognition indicia. Moreover, Japanese Laid-open Patent Publication No. H. 11-219407 (corresponding English publication is U.S. Pat. No. 6,332,046) discloses a technology in which character strings are extracted based on uniformity of characters, and evaluates the character strings are evaluated using character recognition. Furthermore, Japanese Laid-open Patent Publication No. H. 04-211884 discloses a technology that segments a character from a contact character when a line is known.

SUMMARY

According to an aspect of the present invention, a computer-readable storage medium stores a program causing a computer to function as a document recognition apparatus. The program causes the computer to operate as an extraction unit for extracting connected components of pixels from an input image, a generation unit for generating a reference element that is connected to components of pixels extracted by said extraction unit and combined elements obtained by combining the reference element and connected components of pixels adjacent to the reference element as an element to be estimated, a calculation unit for calculating a degree of certainty that indicates how much the element to be estimated generated by the generation unit seems to be a character, and a determination unit for identifying elements that seem to be characters among the elements to be estimated, based on the degree of certainty calculated by the calculation unit.

Additional objects and advantages of the invention will be set forth in part in the description which follows, and in part will be obvious from the description, or may be learned by practice of the invention. The object and advantageous of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIGS. 1A-1D are explanatory diagrams illustrating a comparison between results of a line extraction by a conventional technology and that by a document recognition apparatus of a first embodiment;

FIGS. 4A-4C are an explanatory diagrams illustrating an overview of processing of character rectangle estimation by a document recognition apparatus of the first embodiment;

FIGS. 5A-5D are explanatory diagrams illustrating an overview of processing of character rectangle estimation by a document recognition apparatus of the second embodiment;

FIGS. 6A-6D are explanatory diagrams illustrating a method for calculating a degree of certainty "C";

FIG. 7 is an explanatory diagram illustrating an overview of a line extraction by a document recognition apparatus of an embodiment;

FIG. 8 is a block diagram illustrating a hardware configuration of a document recognition apparatus of an embodiment;

FIG. 11 is a flow chart illustrating processing procedures of a column extraction by a document recognition apparatus;

FIG. 12 is a flow chart illustrating processing procedures of a line extraction by a document recognition apparatus.

DETAILED DESCRIPTION OF THE PREFERRED EMBODIMENTS

Figure 2A:
FIGS. 2A-2D are explanatory diagrams illustrating a comparison between results of a line extraction by a conventional technology and that by a document recognition apparatus of a second embodiment.

All of the above conventional technologies take account of selection or non-selection of a combination of connected components of black pixels as a basic component. However, when a first character component candidate is contiguous with another character, these technologies do not provide a method to separate the first candidate of a character element from the other character. A technology disclosed in Japanese Laid-open Patent Publication No. H.04-211884 regarding segmentation of contact characters may be used only when information on a line is determined. Therefore there is a drawback that accuracy in extracting lines is deteriorated when lines are irregular or noise exists in an image. Thus, the present inventors invented a document recognition apparatus and a method thereof that improves accuracy in a line extraction.

Now, details of an embodiment of a document recognition apparatus and a method thereof will be explained by referring to the accompanying drawings. Note that a "line" shown below means an object comprised of a plurality of characters in a horizontal line, whereas a "column" means an object comprised of a single or a plurality of lines.

First, a comparison between results of a line extraction by a conventional technology and that by a document recognition apparatus of an embodiment will be explained. FIG. 1 is an explanatory diagram illustrating a comparison between results of a line extraction by a conventional technology and that by a document recognition apparatus of a first embodiment. FIG. 1 shows an example when an image shown as a reference numeral 101 (hereunder called, "input image 101") is input.

FIG. 1A illustrates a result of rectangular integration of overlapped connected components of pixels by a conventional technology. The "connected components of pixels" is an area created by connecting specific pixels. The specific pixels here may mean, for example, pixels the value of which is a given pixel value or more. As shown in FIG. 1A, in a conventional technology, when an input image 101 is input, first, a rectangle that circumscribes each connected components of pixels (hereunder called "circumscribed rectangle") in the input image 101 is created, and overlapped circumscribed rectangles are integrated.

FIG. 1B illustrates a result of character rectangle estimation in a conventional technology. The character rectangle here means a rectangle that encloses components that seem to be characters. In a conventional technology, a character rectangle is estimated, for example, from a size of adjacent circumscribed rectangles using the result obtained at FIG. 1A. For example, a lower part of an input image 101 in FIG. 1B shows estimated character rectangles 102 to 105.

In the conventional technology, regarding a character rectangle 102 that encloses "(" and an adjacent character rectangle 103, a size of the character rectangle 103 is estimated from a size of the character rectangle 102, thus a size of "一／括／分／を" is estimated by assuming "一／括／分／を" as one character (enclosed within one character rectangle) although that is actually comprised of four characters. Similarly a size of the character rectangle 104 is estimated by a size of the character rectangle 103 or 105, thus a size of "徴／収／含／む" is estimated by assuming "徴／収／含／む" as one character although that is actually comprised of four characters.

FIG. 1C illustrates a result of a line extraction by a conventional technology. As shown in FIG. 1C, in the conventional technology an area in which continuous character rectangles with a similar size (for example, character rectangles with uniform size) exist is extracted as a line. In other words, in FIG. 1C, a line indicated by a reference numeral 110 is extracted by using character rectangles 102 to 105 shown in FIG. 1B.

FIG. 1D shows a result of a line extraction by a document recognition apparatus of an embodiment. As shown in FIG. 1D, according to the document recognition apparatus of an embodiment, even when characters with different sizes are arranged side by side (for example, "(" and "-" in an input image 101), lines 120 and 130 may be extracted because character rectangles with appropriate sizes are estimated for each of characters. Thus, a line may be extracted with a high-accuracy.

FIG. 2 is an explanatory diagram illustrating a comparison between results of a line extraction by a conventional technology and that by a document recognition apparatus of a second embodiment. In FIG. 2, an input image 201 that includes a noise indicated by a reference numeral 201a is input as shown in FIG. 2A.

Figure 2B:
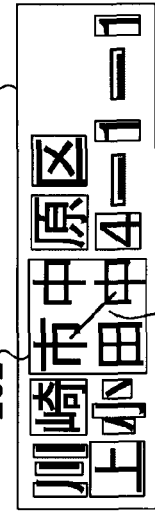

FIG. 2B shows a result of rectangular integration of overlapped connected components of pixels as in FIG. 1A. As shown in FIG. 2B, in a conventional technology, when the input image 201 is input, first, a circumscribed rectangle of connected components of pixels (hereunder called "circumscribed rectangle") in the input image 201 is created, and overlapped circumscribed rectangles are integrated. As shown in a reference numeral 202 in FIG. 2B, because of influence by a noise 201 a, "市／中／田／中" is integrated in single rectangle although the image is actually comprised of four characters.

Figure 2C:
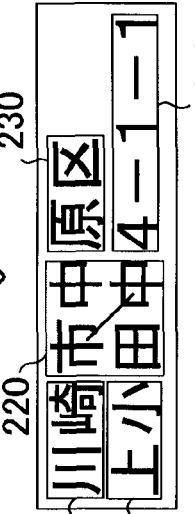

FIG. 2C illustrates a result of extraction by a conventional technology. As shown in FIG. 2C, in the conventional technology an area in which continuous character rectangles with a similar size (for example, character rectangles with uniform size) are extracted as a line. In other words, in FIG. 2C, an actual line is segmented in this way because "市／中／田／中" was integrated into single rectangle in above FIG. 2B, as a result, lines indicated by reference numerals 210, 220, 230, 240, and 250 in FIG. 2C are extracted.

Figure 2D:
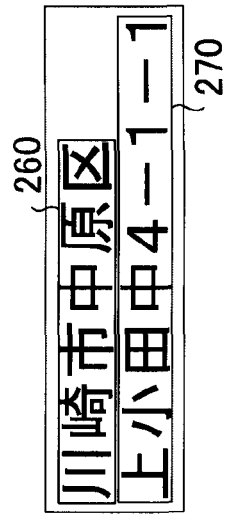

FIG. 2D shows a result of line extraction by a document recognition apparatus of an embodiment. As shown in FIG. 2D, a document recognition apparatus of an embodiment may estimate an appropriate character rectangle even if a noise 201a is included in an input image 201, and lines 260 and 270 may be extracted. Thus, a high-accuracy line extraction may be achieved.

Now, an overview of extraction of a line by a document recognition apparatus of an embodiment will be explained. The document recognition apparatus of an embodiment extracts a line by the following processes: (1) estimation of a character rectangle, (2) extraction of a column, and (3) extraction of a line. In other words, the present document recognition apparatus, first estimates a column that is an upper structural concept of a line that is an object to be extracted, and then lines comprising the column are extracted using the estimated column.

Figure 3A:
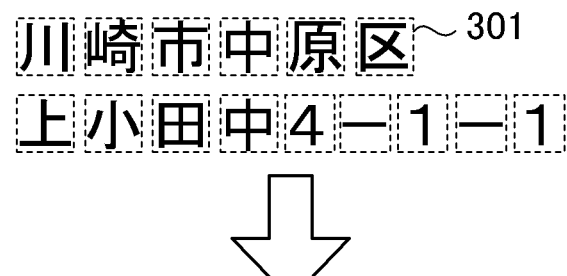
FIGS. 3A-3C are explanatory diagrams illustrating an overview of processing up to a line extraction by a document recognition apparatus of an embodiment.

FIG. 3 is an explanatory diagram illustrating an overview of processing up to a line extraction by a document recognition apparatus of an embodiment. In initial processing to estimate a character rectangle (process (1)), the document recognition apparatus of an embodiment estimates a character rectangle (for example, a character rectangle shown as a reference numeral 301 in FIG. 3A). A processing of character rectangle estimation will be described later by referring to FIG. 4.

Figure 3B:
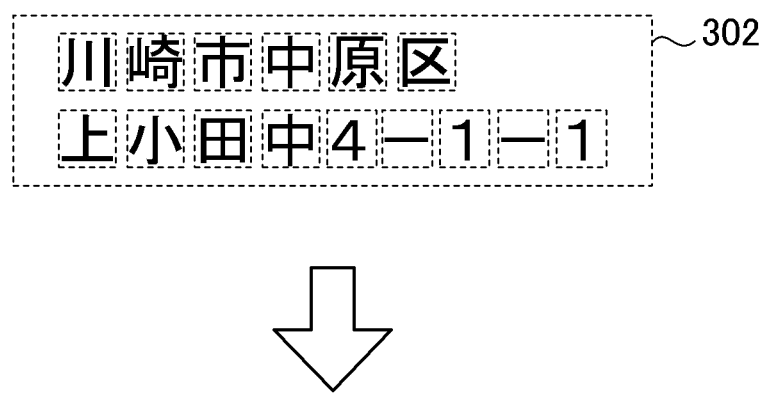
Figure 3C:

After estimating a character rectangle, a column is extracted (process (2)). The document recognition apparatus estimates, for example, a column (for example, a column shown as a reference numeral 302 in FIG. 3B) comprised of a set of character rectangles with a uniform size as shown in FIG. 3B. Processing of a column extraction will be described later.

After estimating a column, the document recognition apparatus extracts, for example, lines comprising the estimated column (for example, a column shown as a reference numeral 303 in FIG. 3C) (process (3)). Processing of a line extraction will be described later by referring to FIG. 7.

As described above, the document recognition apparatus of an embodiment achieves a high-accuracy line extraction by following the above line extraction processing (1) to (3). Now, how the above processing is achieved will be explained in detail.

Now, the above described process (1) (overview of character rectangle estimation by a document recognition apparatus of an embodiment) will be explained. The document recognition apparatus extracts connected components of pixels from an input image when estimating character rectangles. Then, based on the extracted connected components of pixels (reference element), the reference element, and combined elements obtained by combining the reference element and the adjacent connected components of pixels are generated as elements to be estimated. The elements to be estimated here may include, for example, connected components of pixels and combined elements that are estimated for how much they seem to be characters.

Next, the document recognition apparatus evaluates the subject elements for a degree of likelihood of being a character by using a degree of certainty "C" (an example of calculation method will be described later by referring to FIG. 6). In other words, the degree of certainty "C", here, is a value for evaluating how much elements to be estimated seem to be characters. By evaluating this, the document recognition apparatus determines the most appropriate element (element that seems to be a character match) among elements to be estimated.

Even when an element to be estimated is actually a part of a larger character, the part itself might be interpreted as one character (for example, a character "語" includes components "一", "二", "三", "言", "口", "吾" and "五", and each of these components may be interpreted as one character). Thus, the document recognition apparatus of an embodiment generates combined elements by sequentially combining a reference element and other elements located near the lower right of the reference element. An upper limit of numbers of elements for generating combined elements are specified beforehand.

When an object that seems to be a character indicated by an element to be estimated shows low reliability as a character (when a degree of certainty "C" is less than a threshold value), the document recognition apparatus segments the character rectangle that encloses the element to be estimated into smaller rectangular areas (called "segmented rectangle" hereunder). Then using the segmented rectangles, the document recognition apparatus regenerates combined elements. Among the generated combined elements, elements that have a degree of certainty "C" higher than or equal to a given threshold value are determined to be appropriate elements.

As elements to be estimated are sequentially evaluated for a degree of likelihood of being a character, the degree of certainty "C" shows a high value if a pattern that may seem to be a character exists. This means that the degree of certainty "C" reaches almost a maximum value for combined elements with a correct pattern (in other words, a pattern that makes a character), and then the value lowers as excess connected components of pixels are added.

Therefore, according to the document recognition apparatus of an embodiment, a given threshold value is specified beforehand in order to judge whether an object seem to be a character or not. When the threshold value is exceeded, the last combined elements are judged to be a correct pattern. If no degrees of certainty for elements to be estimated exceeds the threshold value, no character rectangle is determined because there is no appropriate element to be estimated (this means that the element is not determined to be a character).

FIG. 4 is an explanatory diagram illustrating an overview of processing of character rectangle estimation by a document recognition apparatus of a first embodiment. FIG. 4 shows an overview of processing of character rectangle estimation when an image indicated by a reference numeral 410 (hereunder called "input image 410") is input.

When the input image 410a shown in FIG. 4A is input, the document recognition apparatus of an embodiment extracts connected components of pixels from the input image 410. For example, in FIG. 4A, connected components of pixels 421 (reference element) are extracted from an image 410a that indicates "給" included in the input image 410.

Moreover, when connected components of pixels 421 are extracted, the document recognition apparatus generates combined elements by combining connected components of pixels 421 and other connected components of pixels adjacent to the rectangle 421 (for example, connected components of pixels 422). For example, when generating combined elements, the document recognition apparatus first sets a reference point on a given point on a circumscribed rectangle of each of the connected components of pixels. For example, as shown in FIG. 4A, for connected components of pixels 421 to 425, upper left apexes of R1 to R5 are set as reference points.

After setting the reference points, combined elements are generated from a combination of elements such that the distance between a reference point of a reference element (here, a reference point R1 of connected components of pixels 421) and a reference point of other connected components of pixels are the nearest. For example, a combination of elements such that the distance between a reference point of a reference element and other connected components of pixels is the nearest is determined as below.

As shown in FIG. 4A, when connected components of pixels 421 are assumed to be a reference element, first, a straight line "S1" is drawn that passes the reference point R1 of connected components of pixels 421. The straight line S1 here is for example, a line that is parallel to "y=x."

Then a degree of certainty "C" of connected components of pixels 421 is calculated. As described before, a method to calculate the degree of certainty "C" is explained using FIG. 6, so it will not be explained here. The connected components of pixels 421 of this state are indicated as a pattern 1 in FIG. 4B.

The straight line S1 is moved in parallel in a lower right direction until it reaches a reference point of other connected components of pixels. When the straight line S1 is moved in parallel in the lower right direction, first the line reaches the reference point R2 of connected components of pixels 422 indicated as a reference numeral S2 in FIG. 4A. Then, the document recognition apparatus generates combined elements of the connected components of pixels 421 and the connected components of pixels 422, and calculates the degree of certainty "C". The combined elements of this state are shown as a pattern 2 in FIG. 4B.

Now, when the straight line is further moved in parallel from S2 in the lower right direction, the line reaches a reference point R3 of connected components of pixels 423 indicated as a reference numeral S3 in FIG. 4A. Then, the document recognition apparatus generates combined elements of the connected components of pixels 421, 422 and 423, and calculates the degree of certainty "C". The combined elements of this state are shown as a pattern 3 in FIG. 4B.

When the straight line is further moved in parallel from S3 in the lower right direction, the line reaches a reference point R4 of connected components of pixels 424 indicated as a reference numeral S4 in FIG. 4A. Then, the document recognition apparatus generates combined elements of the connected components of pixels 421, 422, 423 and 424, and calculates the degree of certainty "C". The combined elements of this state are shown as a pattern 4 in FIG. 4B.

Moreover, when the straight line is further moved in parallel from S4 in the lower right direction, the line reaches a reference point R5 of connected components of pixels 425 indicated as a reference numeral S5 in FIG. 4A. Then, the document recognition apparatus generates combined elements of the connected components of pixels 421, 422, 423, 424, and 425 and calculates the degree of certainty "C". The combined elements of this state are shown as a pattern 5 in FIG. 4B.

Similarly although not shown in FIGS., when the straight line is further moved in parallel from S5 in the lower right direction, the line reaches a reference point of connected components of pixels that indicates the upper part of "与" in the input image 410. Then, the document recognition apparatus generates combined elements of the connected components of pixels 421, 422, 423, 424, 425, and connected components of pixels that indicates the upper part of "与", and calculates the degree of certainty "C". The combined elements of this state are shown as a pattern 6 in FIG. 4B.

Likewise, when the straight line is further moved in parallel in the lower right direction, the line reaches a reference point of connected components of pixels that indicates "-" in the input image 410. Then, the document recognition apparatus generates combined elements of the connected components of pixels 421, 422, 423, 424, 425, upper part of connected components of pixels that indicates "与" and that indicates "-", and then calculates the degree of certainty "C". The combined elements of this state are shown as a pattern 7 in FIG. 4B.

As explained above, the document recognition apparatus sequentially generates combined elements starting from a combination such that the distance between a reference point of a reference element and a reference point of other connected components of pixels are the nearest. For a reference element, for example, ten combined elements may be generated.

A graph in FIG. 4B shows changes in the degree of certainties "C" sequentially calculated above. When degrees of certainties (C) are sequentially calculated, the degree of certainty "C" shows a high value if a correct pattern (for example, the above pattern 2 or the pattern 5) that indicate that a character exists. Thus, combined elements that have a degree of certainty "C" higher than or equal to a given threshold value or more are determined to be a correct pattern and a character rectangle that encloses these combined elements is determined (in other words, these combined elements are grouped as one character).

As shown in FIG. 4C, when there are a plurality of patterns that have a degree of certainty "C" higher than or equal to a given threshold value or more, the document recognition apparatus identifies the last generated element to be estimated as an element that seems to be a character among elements to be estimated that have a degree of certainty "C" higher than or equal to a given threshold value.

When an element to be estimated has a low degree of certainty "C" (for example, an element to be estimated that the degree of certainty "C" is less than a threshold value), the document recognition apparatus segments the element to be estimated into a plurality of rectangular areas (called "segmented rectangle" hereunder). Then using the segmented rectangles, the document recognition apparatus regenerates combined elements. An overview of combined elements generation using segmented rectangles will be explained below.

FIG. 5 is an explanatory diagram illustrating an overview of processing of character rectangle estimation by a document recognition apparatus of a second embodiment. FIG. 5 shows an overview of processing of character rectangle estimation when an input image 510 that includes noise indicated by a reference numeral 510a in FIG. 5A is input.

FIG. 5A illustrates a result of rectangular integration of overlapped connected components of pixels of the input image 510 that includes a noise 510a. Combined elements in a rectangle indicated by a reference numeral 511 in FIG. 5A have a degree of certainty "C" higher than a given threshold value or more, whereas combined elements in a character rectangle indicated by a reference numeral 512 do not have a given threshold value of degree of certainty "C" or more.

At this time, as shown in FIG. 5B the document recognition apparatus segments the character rectangle 512 that does not have a degree of certainty higher than a given threshold value or more (for example, a character rectangle indicated by a reference numeral 513 in FIG. 5B) into smaller segmented rectangles. Then, as shown in FIG. 5C, using the segmented rectangles, the document recognition apparatus regenerates combined elements. As shown above, a degree of certainty "C" is calculated for each of the combined elements, and the combined elements with a given degree of certainty "C" or more is determined to be a correct pattern. Thus, as shown in FIG. 5D, a character rectangle of combined elements with a given degree of certainty "C" or more is estimated (for example, character rectangles indicated by reference numerals 514 and 515 in FIG. 5D).

In the above example, an order to combine elements is determined by using a straight line that is parallel to a line that corresponds to "y=x", where a two-dimensional graph is assumed that "y"=vertical axis and "x"=horizontal axis, however the method is not limited to this. In the above example, it is assumed that a shape of character rectangle of combined elements may be close to a square, and a straight line that is parallel to "y=x" is used. However, if it is known that a shape of character rectangle is vertically long beforehand (for example, a character in an input image is known to be vertically long such as an alphabetic character beforehand), a straight line that is parallel to "y=2x" may be set and used. This is optionally set, for example, by a user.

Now, a method for calculating a degree of certainty "C" is described. As explained above, the degree of certainty "C" is an evaluation value that indicates a degree of similarity for feature quantity of an input image (such as a selected element to be estimated). The method for calculating a degree of certainty "C" is disclosed in detail in Japanese Laid-open Patent Publication No. 2000-306045, thus it is briefly explained here.

FIG. 6 is an explanatory diagram illustrating a method for calculating a degree of certainty "C". In order to obtain a degree of certainty "C", an element to be estimated and a character in a dictionary are compared. More specifically, in FIG. 6A, a feature vector that indicates a feature quantity of an element to be estimated "あ" (at this stage, it is unknown whether this is a character or not) and a feature vector that indicates each of registered characters ("n" pieces) in the dictionary are obtained. Then distances of "d1" to "dn" between the feature vector of an element to be estimated, "あ" and feature vectors for each of registered characters in the dictionary ("n" pieces) are obtained. The smaller the distance of a registered character, higher the degree of similarity to the elements to be estimated. Thus obtained distances are sorted by ascending order.

FIG. 6B indicates a result of sorting by ascending order. Then, as shown in FIG. 6C, the distance of the first is divided by that of the second. When a value of K ($0<K\leq1$) is small, this means the difference of distances between the first and the second is large, which indicates a higher possibility that the element to be estimated is similar to the registered character ranked the first. Conversely the larger the value of "K", it is more difficult to distinguish the first and the second. Therefore, as shown in FIG. 6D, the smaller the value of "C", the larger value of degree of certainty is assigned, whereas the larger the value of "K", the smaller value of degree of certainty "C" is assigned. The degree of certainty "C" here is $0 \leq C \leq 999$. As explained above, when a degree of certainty "C" is high, it means that there is a registered character uniquely corresponds to the element to be estimated.

According to this embodiment, the above method is used to calculate a degree of certainty "C"; however, the degree of certainty "C" may be calculated by simply using a distance value. The high-accuracy evaluation may be achieved by calculating the degree of certainty "C" by simply using a distance, even when the degree of certainty "C" calculated by the above method may show a high value even for a blurred character and as a result the evaluation accuracy may be deteriorated.

Now, the above mentioned process (2) overview of extraction of a column by the document recognition apparatus is explained here. In a processing of extraction of a column by the document recognition apparatus, an area in which sizes of character rectangles are uniform is extracted using the character rectangle estimated by the above processing of estimation of a character rectangle. More specifically an area comprised of a group of character rectangles is extracted as a column that is obtained by sequentially integrating character rectangles horizontally and vertically adjacent to a reference character rectangle with almost the same size as the reference character rectangle. If the extracted area has an overlapped part, verification is performed by using a character with a high degree of certainty "C", segmentation and integration is performed, and thereby a column is estimated.

Now, the above described overview of extraction of a line by a document recognition apparatus of an embodiment is explained. In extraction of a line by a document recognition apparatus, first, a position of a line space is estimated by a histogram using the information on a column extracted by the above described processing of extraction of a column.

FIG. 7 is an explanatory diagram illustrating an overview of a line extraction by a document recognition apparatus of an embodiment. For example, a character rectangle indicated by a reference numeral 701 in FIG. 7 includes combined elements that the degree of certainty "C" is higher than or equal to a given threshold value. On the other hand, a character rectangle indicated by a reference numeral 702 in FIG. 7 includes combined elements that the degree of certainty "C" is less than a threshold value. A column indicated by a reference numeral 710 in FIG. 7 is a column extracted by the above processing of extraction of a column.

A histogram shown in FIG. 7 is obtained by projecting connected components of pixels toward a specified line direction. This means the histogram in FIG. 7 indicates intensity of pixels (number of pixels) on a perspective axis. For example, "A" indicates an intensity of pixels (number of pixels) on a perspective axis A, while "B" indicates an intensity of pixels (number of pixels) on a perspective axis B. Then, the document recognition apparatus estimates a position where a bottom of histogram locates (in other words, fewer pixels exists on a perspective axis) to be a line space among a column 710. Subsequently the document recognition apparatus judges whether the perspective axis segments a character with a high degree of certainty "C" (for example, combined elements with a given threshold value or more) from the estimated line space or not.

As shown in FIG. 7, for example, when the character rectangle 701 that includes combined elements with high degree of certainty "C" is segmented by a line, the document recognition apparatus rejects the position as a line space, and determines a position where no combined elements with high degree of certainty are segmented as a line space. In a case shown in FIG. 7, the document recognition apparatus determines a position of "B" as a line space, because a position of "A" segments a character rectangle 701 with a high degree of certainty "C". Then, along the line space, an area having character rectangles that include elements that seem to be characters are extracted as lines. Thus, lines indicated by a reference numeral 720 and a reference numeral 730 are extracted.

A hardware configuration of a document recognition apparatus of an embodiment is explained. FIG. 8 is a block diagram illustrating a hardware configuration of a document recognition apparatus of an embodiment.

In FIG. 8, a document recognition apparatus 800 has a central processing unit (CPU) 801, a read only memory (ROM) 802, a random access memory (RAM) 803, a hard disk drive 804, a hard disk 805, an optical disk drive 806, an optical disk 807, a display 808, an interface (I/F) 809, a keyboard 810, a mouse 811, a scanner 812, and a printer 813. All of the components are connected by a bus 820

The CPU 801 controls the entire document recognition apparatus 800. The ROM 802 stores a program such as a boot program. The RAM 803 is used as a work area for the CPU 801. Under control of CPU 801, the hard disk drive 804 controls reading and writing data to and from the hard disk 805. The hard disk 805 stores data written under control of the hard disk drive 804.

Under control of CPU 801, the optical disk drive 806 controls reading and writing data to and from the optical disk 807. The optical disk 807 stores data written under control of an optical disk drive 806, and causes the document recognition apparatus 800 to read data stored in the optical disk 807.

As an optical disk 807, a compact disk (CD), a digital versatile disk (DVD), a magneto optical (MO), and a memory card may be used. A display 808 may display a cursor, an icon, and a tool box, and data such as a document, an image and functional information. As a display 808, a cathode ray tube (CRT), a thin film transistor (TFT), a liquid crystal display and a plasma display may be used.

The I/F 809 is connected to a network 814 such as an internet via a communication line, and connected to other devices via this network 814. Then the I/F 809 controls the network 814 and an internal interface, and controls input and output of data to and from external devices. As the I/F 809, for example, a modem and a LAN adapter may be used.

A keyboard 810 has keys for inputting characters, numbers and various instructions and performs data input. The keyboard 810 may be an input pad with touch panel method or ten keys. A mouse 811 moves a cursor, selects an area, or moves a window, and changes the size of a window. As the mouse 811, a track ball or a joy stock may be used as long as it provides functions for a pointing device.

A scanner 812 optically reads an image and stores the image data in a computer device. The scanner 812 may have a function of an optical character reader (OCR). The printer 813 prints image data and document data. As the printer 813, for example, a laser printer and an ink jet printer may be used.

Figure 9:
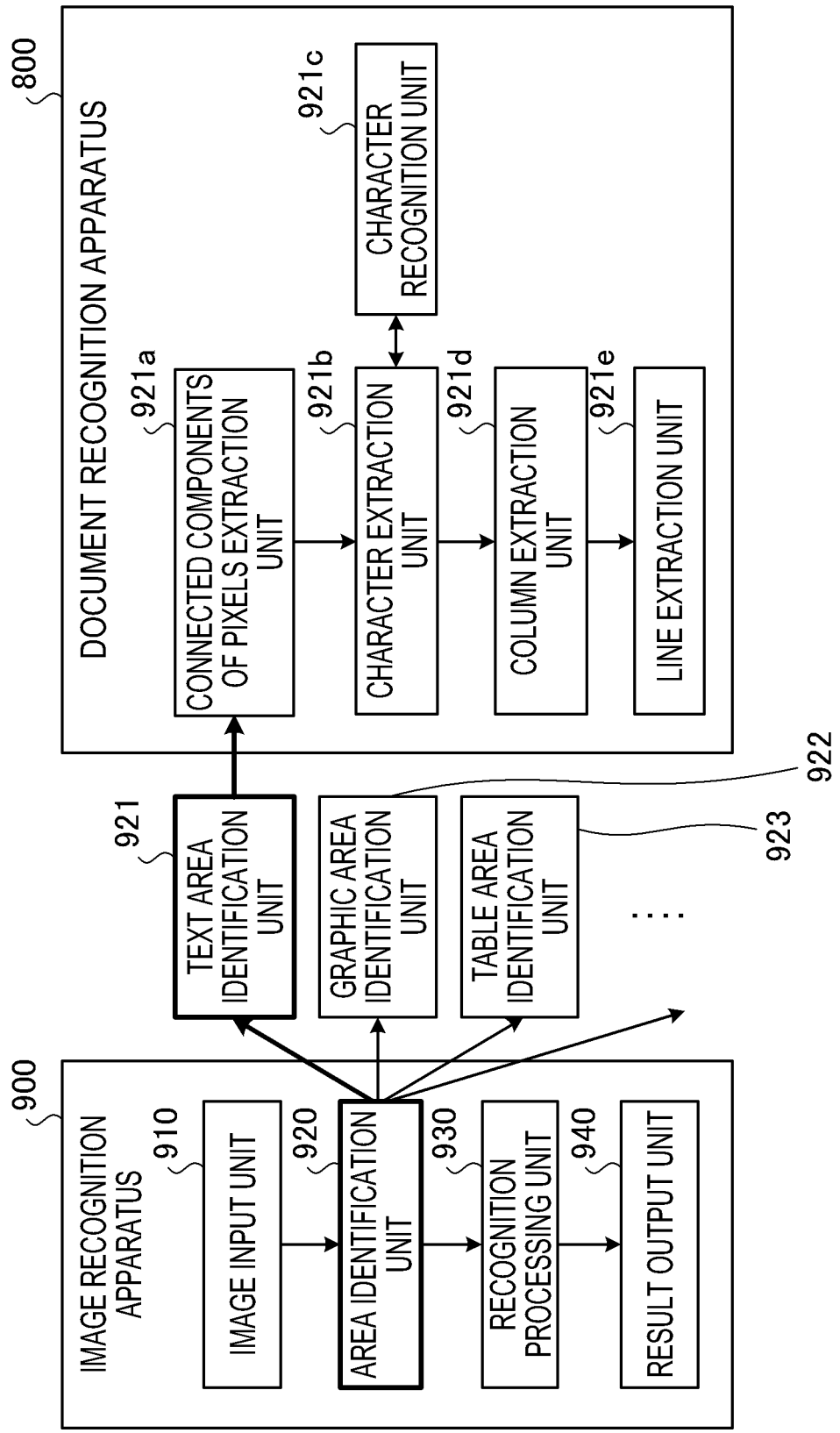
FIG. 9 is a block diagram illustrating a functional configuration of a document recognition apparatus of an embodiment.

Next, a functional configuration of a document recognition apparatus 800 is explained. FIG. 9 is a block diagram illustrating a functional configuration of a document recognition apparatus of an embodiment. As shown in FIG. 9, the document recognition apparatus 800 is provided as a part of an image recognition apparatus 900.

The image recognition apparatus 900 is known technology and thus it will not be explained in detail here. The image recognition apparatus 900 performs image recognition for input image and outputs the result of the image recognition. More specifically the image recognition apparatus 900 has an image input unit 910, an area identification unit 920, a recognition processing unit 930, and a result output unit 940 and configured so that the above functions are achieved.

The image input unit 910 provides a function to receive an image input. The area identification unit 920 provides a function to identify an area in input image by an identification unit depending on a type of input image, and outputs the identification result to the recognition processing unit 930. The result output unit 940 provides a function to output the result of image identification identified by the recognition processing unit 930.

More specifically the area identification unit 920 has, for example, a text area identification unit 921, a graphic area identification unit 922, and a table area identification unit 923, and an area in an input image is identified by an identification unit depending on a type of input image.

The text area identification unit 921 provides a function to identify a text area (a character area) from an input image. The graphic area identification unit 922 provides a function to identify a graphic area from an input image. The table area identification unit 923 provides a function to identify a table area from an input image.

The document recognition apparatus 800 of this embodiment is provided as a part of the text area identification unit 921. The document recognition apparatus 800 has connected components of pixels extraction unit 921a, a character extraction unit 921b, a character recognition unit 921c, a column extraction unit 921d, and a line extraction unit 921e. When the connected components of pixels extraction unit 921a extracts connected components of pixels, the unit 921a outputs the extraction result to the character extraction unit 921b.

Among the connected components of pixels extracted by the connected components of pixels extraction unit 921a, the character extraction unit 921b generates combined elements from connected components of pixels and the adjacent connected components of pixels. The character extraction unit 921b, determines elements to be estimated (extracted connected components of pixels or combined elements based on connected components of pixels) with a degree of certainty "C" higher than or equal to a given threshold value as elements that seems to be characters, based on the result of character recognition by the character recognition unit 921c. Then, a character rectangle of the elements to be estimated is estimated and extracted as a character. The character recognition unit 921c performs character recognition of elements to be estimated such as connected components of pixels, extracted using a degree of certainty "C" by character extraction unit 921b, and generated combined elements.

The column extraction unit 921d extracts an area comprised of character rectangles with uniform size as a column from characters extracted by the character extraction unit 921b. The line extraction unit 921e extracts lines from the column extracted by the column extraction unit 921d. For example, as shown in FIG. 7, using a histogram, a line is extracted by estimating an appropriate line space among a column. Moreover, as shown in FIG. 7, the line extraction unit 921e extracts a line by assuming a position where no character rectangle with a high degree of certainty "C" is segmented as a line space.

The functions of above described image input unit 910, an area identification unit 920, a recognition processing unit 930, and a result output unit 940 are enabled by the above described CPU 801 executing various programs stored in the ROM 802, the RAM 803, and the hard disk 805.

Figure 10A:
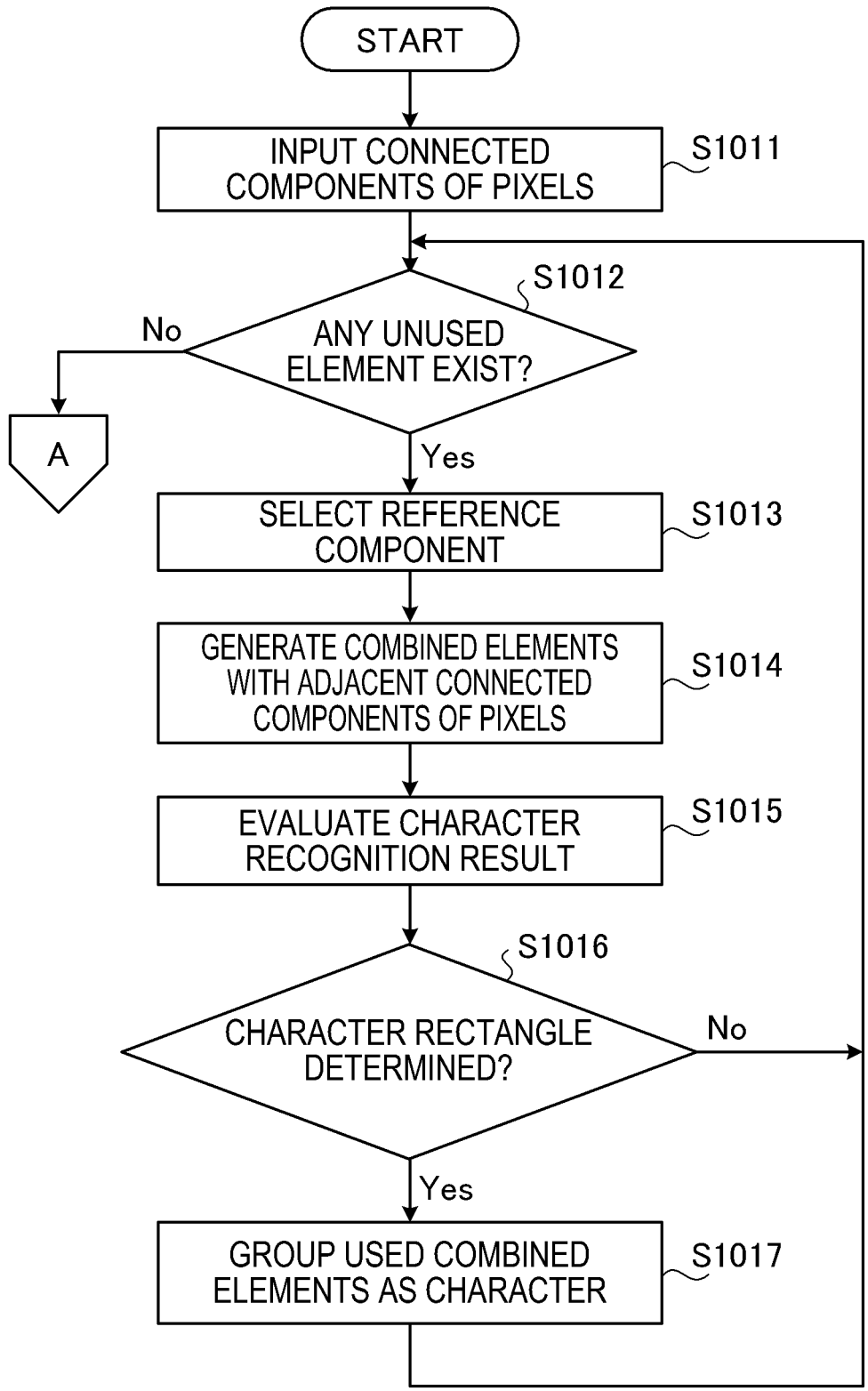
FIG. 10A is a flow chart illustrating processing procedures of character rectangle estimation by the first embodiment of the document recognition apparatus.

Processing procedures for character rectangle estimation by a document recognition apparatus are explained here. FIG. 10A is a flow chart illustrating processing procedures of character rectangle estimation by a first embodiment of the document recognition apparatus.

As shown in FIG. 10A, in processing of character rectangle estimation, an element in an input image is input to a document recognition apparatus 800 (Operation S1011). In Operation S1011, when an element in an input image is input, the document recognition apparatus 800 judges whether any unused element exists or not among input elements (Operation S1012). The unused element here means for example, an element to which no character rectangle is set.

In Operation S1012, when it is judged that any unused element to be estimated exists (Operation S1012: Yes), the document recognition apparatus 800 selects a reference element (Operation S1013). When it is judged that any unused element to be estimated does not exist (Operation S1012: No), the document recognition apparatus 800 proceeds to Operation S1021 in FIG. 10B that will be described later.

In Operation S1013, after selecting a reference element, the document recognition apparatus 800 generates combined elements from a reference element and the adjacent element (Operation S1014). For example, as shown in FIG. 4A, assuming a reference element as connected components of pixels 421, combined elements are generated from the connected components of pixels 421 and the adjacent connected components of pixels 422.

After generating combined elements at Operation S1014, the document recognition apparatus 800 performs character recognition for the generated combined elements and evaluates the character recognition result (Operation S1015). More specifically the document recognition apparatus 800 evaluates the generated combined elements using a degree of certainty "C". The method to calculate a degree of certainty "C" has been explained by referring to FIG. 6.

After performing evaluation using a degree of certainty "C" in Operation S1015, the document recognition apparatus 800 judges whether a character rectangle is identified or not (Operation S1016). For example, using a graph in FIG. 4B, the document recognition apparatus 800 judges whether combined elements with a degree of certainty "C" higher than a threshold value or more exist, and a character rectangle determination is made by the combined elements.

In Operation S1016, when it is judged that a character rectangle may be present (Operation S1016: Yes), the document recognition apparatus 800 groups these combined elements as a character (this means enclosing these elements with one character rectangle) (Operation S1017), and returns to Operation S1012, and repeats the above processing. In Operation S1016, when it is judged that a character rectangle may not be determined (Operation S1016: No), the processing returns to S1012, and repeats the above processing. A series of operations S1011 to S1017 shown in the above FIG. 10A is hereunder called "character grouping processing."

Figure 10B:
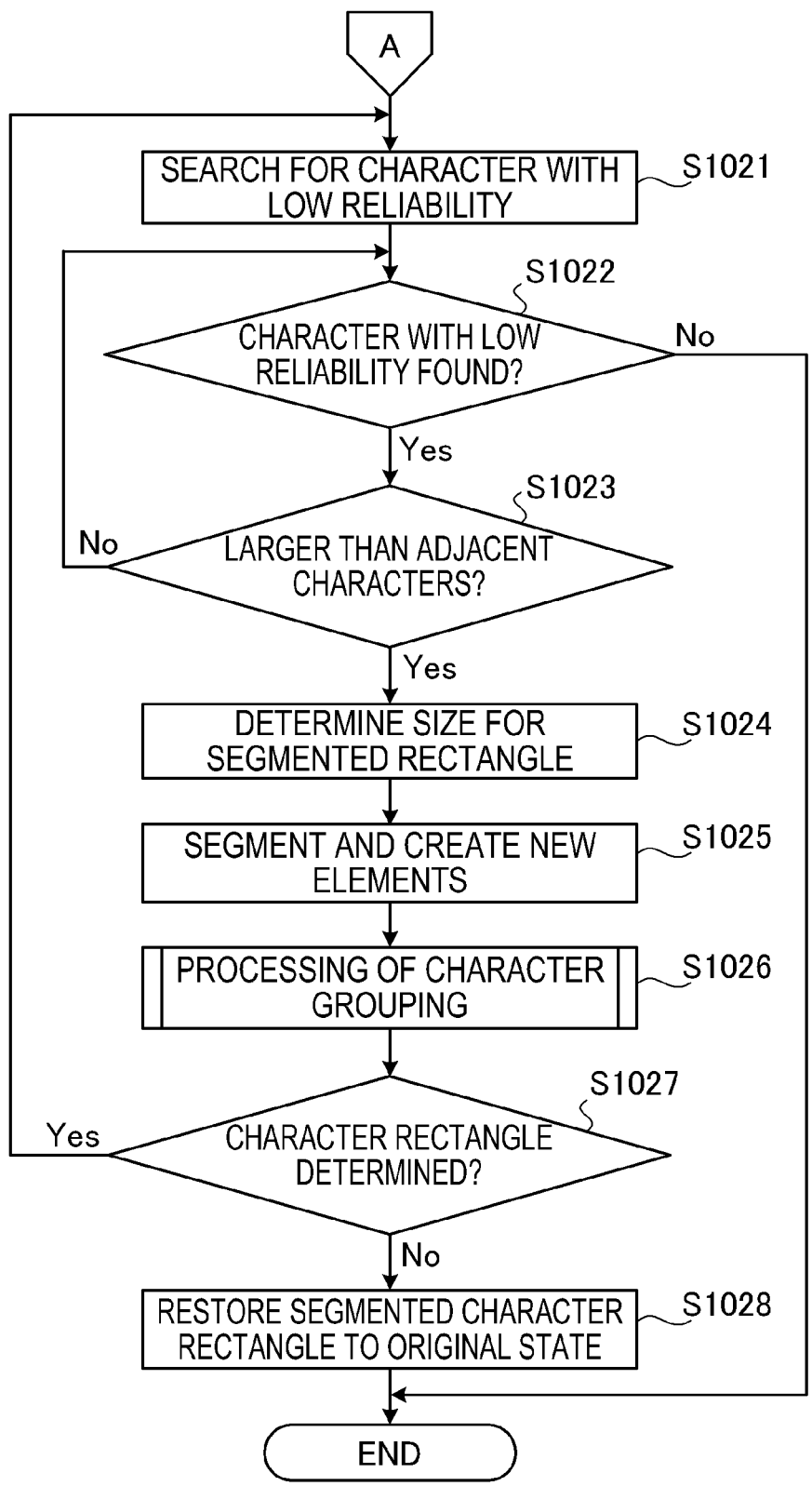
FIG. 10B is a flow chart illustrating processing procedures of character rectangle estimation by the second embodiment of the document recognition apparatus.

FIG. 10B is a flow chart illustrating processing procedures of character rectangle estimation by the second embodiment. In Operation S1012 in the above FIG. 10A, when it is judged that no unused element exists (Operation S1012: No), the document recognition apparatus 800 searches for characters with low reliability among objects grouped as characters (Operation S1021). More specifically, the document recognition apparatus 800 searches for combined elements with a degree of certainty "C" that is less than a given value.

After searching for a character with low reliability in Operation S1021, the document recognition apparatus 800 judges whether a character (an element that seems to be a character) with low reliability is found or not (Operation S1022). More specifically the document recognition apparatus 800 judges whether combined elements enclosed by a character rectangle such as a character rectangle 512 in FIG. 5A are found or not.

In Operation S1022, when it is judged that a character with a low reliability is found (Operation S1022: Yes), the document recognition apparatus 800 judges whether the found low reliability character is larger than the adjacent characters or not (Operation S1023). More specifically it is judged whether the size of the character rectangle enclosing the low reliability character is larger than character rectangles enclosing adjacent other characters around or not. On the other hand, in Operation S1022, when it is judged that a character with low reliability is not found (Operation S1022: No), the document recognition apparatus 800 completes processing of character rectangle estimation.

In Operation S1023, when it is judged that the character with low reliability is larger than nearby characters (Operation S1023: Yes), the document recognition apparatus 800 determines a size for segmenting the character rectangle (Operation S1024). In Operation S1024, after determining the size for the segmented rectangle, the document recognition apparatus 800 segments the character rectangle by the determined size, and creates new elements (Operation S1025). The segmentation of the character rectangle has been described as shown in FIG. 5B. In Operation S1023, when it is judged that a character with low reliability is not larger than nearby characters (Operation S1023: No), the processing returns to Operation S1022, and repeats the above processing.

In Operation S1025, after segmenting a character and creating new elements, the document recognition apparatus 800 performs the same processing as the above processing of character grouping (Operation S1026). In other words, new elements are input and combined elements are generated based on the elements and the degree of certainty "C." Then appropriate combined elements are selected and the character rectangle is estimated. Although in the processing of grouping shown in FIG. 10A, when it is judged that no unused element exists in Operation S1012 (Operation S1012: No), the processing proceeds to Operation S1021 in FIG. 10B, and when it is judged here that there is no unused element exists, the processing proceeds to Operation S1027.

After estimating a character rectangle in Operation S1026, the document recognition apparatus 800 judges whether a character rectangle may be identified by the estimation or not (Operation S1027). In Operation S1027, when it is judged that a character rectangle is present (Operation S1027: Yes), the document recognition apparatus 800 restores the segmented character rectangle to the original state (the state before segmentation) (Operation S1028), and completes the series of processing. In Operation S1027, when it is judged that a character rectangle is not present (Operation S1027: No), the document recognition apparatus 800 returns to Operation S1021 and repeats the above processing.

Now, processing procedures of a column extraction by a document recognition apparatus is explained. FIG. 11 is a flow chart illustrating processing procedures of a column extraction by a document recognition apparatus.

As shown in FIG. 11, first, a character element is input to the document recognition apparatus 800 (Operation S1101). A character element, here, is an element that seems to be a character and to which a character rectangle is determined by the above processing of character rectangle estimation.

In Operation S1101, when a character element is input, the document recognition apparatus 800 judges whether any unused character element exists or not (Operation S1102). This means that the document recognition apparatus 800 judges whether columns are set for all of the character elements or not. If it is judged that no unused character element exists (Operation S1102: No), the document recognition apparatus 800 assumes columns are set for all of character elements, and completes the processing of a column extraction.

In Operation S1102, when it is judged that any unused character element exists (Operation S1102: Yes), the document recognition apparatus 800 selects a reference character element (Operation S1103). In Operation S1103, after selecting the reference character element, the document recognition apparatus 800 horizontally integrates character elements starting from the reference character element (Operation S1104).

After performing horizontal integration in Operation S1104, the document recognition apparatus 800 similarly performs vertical integration (Operation S1105), and integrates vertical and horizontal areas based on the results of integration obtained by Operation S1104 and Operation S1105 (Operation S1106).

After integrating horizontal and vertical areas in Operation S1106, the document recognition apparatus 800 judges whether the integrated area is overlapped with an existing column or not (Operation S1107). In Operation S1107, if it is judged that the integrated area is overlapped with the existing column (Operation S1107: Yes), the document recognition apparatus 800 judges whether sizes of characters included in each of overlapped columns are almost the same or not (Operation S1109). More specifically the document recognition apparatus 800 judges whether sizes of character rectangles of character elements in each of overlapped columns are almost the same or not. On the other hand, if it is judged that the integrated area is not overlapped with the existing column (Operation S1107: No), the document recognition apparatus 800 groups the integrated area and the existing column as one column (Operation S1108), the processing returns to Operation S1102, and repeats the above processing.

In Operation S1109, if it is judged that the sizes of characters are almost the same (Operation S1109: Yes), the document recognition apparatus 800 proceeds to Operation S1108, and groups the characters as one column. On the other hand, if it is judged that the sizes of characters are not almost the same (Operation S1109: No), the document recognition apparatus 800 segments a rectangle that has fewer rectangles established as characters (this means character rectangles that have already been established) (Operation S1110). For example, it is assumed that there are two columns, a column A and a column B having different sizes of characters in the areas (the number of established character rectangles are: the column A>the column B). At this time, in the area where the column A and the column B overlap, the column B is segmented so that the area of the column B is not overlapped with the area of the column A (the column B may be segmented into new columns B1 and B2. At this time, both the columns B1 and B2 are the columns that do not include area of the column A). As a result, the column A and the column B are not overlapped anymore. In Operation S1110, after segmenting a rectangle with fewer rectangles established as characters (in other words, established character rectangles), the document recognition apparatus 800 returns to Operation S1102, and repeats the above processing.

Now, the processing procedures of a line extraction by a document recognition apparatus are explained. FIG. 12 is a flow chart illustrating processing procedures of a line extraction by a document recognition apparatus.

As shown in FIG. 12, the column obtained by the above column extraction processing is input to the document recognition apparatus 800 (Operation S1201). For example, as shown in FIG. 7, a column 710 is input to the document recognition apparatus 800.

In Operation S1201, when a column is input, the document recognition apparatus 800 judges whether any unused column exists or not (Operation S1202). That means the document recognition apparatus 800 judges whether lines are set for all of columns or not. If it is judged that no unused column exists (Operation S1202: No), the document recognition apparatus 800 assumes that lines are set for all of columns and performs integration of columns (Operation S1203) and completes processing of a line extraction. The integration of columns here is processing for creating a column by integrating a single or a plurality of lines.

In Operation S1202, if it is judged that unused columns exist (Operation S1202: Yes), the line direction is identified (Operation S1204). More specifically, the document recognition apparatus 800 creates histograms for both vertical and horizontal directions and assumes one with less lines as the line direction (for example one with a smaller number of hills in the histogram). After identifying the direction of a line in Operation S1203, the document recognition apparatus 800 detects a line (Operation S1205). More specifically, as shown in FIG. 7, a position where fewer black pixels exist is estimated using a histogram, the estimated position is assumed as a position of a line space, and it is verified whether a character rectangle is segmented by the line or not.

In Operation S1206, after verifying lines, the document recognition apparatus 800 judges whether any contradiction exists for lines and characters or not by using the verification results in Operation S1206 (Operation S1206). More specifically the document recognition apparatus 800 judges that contradiction exists when a character rectangle is segmented by a line, whereas it is judged that no contradiction exists when no character rectangle is segmented.

In Operation S1207, if it is judged that contradiction exists (Operation S1207: Yes), the document recognition apparatus 800 judges whether the contradicted object is a character rectangle with a high degree of certainty "C" or not (Operation S1207). On the other hand, in Operation S1207, if it is judged that there is no contradiction (Operation S1207: No), the document recognition apparatus 800 returns to Operation S1202, and repeats the above processing.

In Operation S1208, if it is judged that the contradicted object is not a character rectangle with a high degree of certainty "C" (Operation S1208: No), the document recognition apparatus 800 segments the contradicted connected components of pixels along a line (Operation S1208). For example, as shown in FIG. 7, a character rectangle segmented by a perspective axis "B" is a character rectangle 702 with a low degree of certainty "C", and connected components of pixels in the character rectangle 702 are segmented along the line.

In Operation S1208, if it is judged that the contradicted object is a character rectangle with a high degree of certainty "C" (Operation S1208: Yes), the document recognition apparatus 800 reviews the line (Operation S1209). For example, as shown in FIG. 7, a character rectangle segmented by a perspective axis "A" is a character rectangle 701 with a high degree of certainty "C", so the line is reviewed. By the review, it is determined that the perspective axis A is inappropriate as a position of a line space and a perspective axis "B" that does not segment a character rectangle with a high degree of certainty "C" is determined to be a position of a line space instead.

In Operation S1209, after readjusting a line space, the document recognition apparatus 800 judges whether a line space in a column is substantially constant or not (Operation S1210), and if it is judged to be substantially constant (Operation S1211: Yes), the processing returns to the Operation S1202 and repeats the above processing. If it is judged that a line space is not substantially constant (Operation S1211: No), a column is segmented at a position where a line space and a character space change (Operation S1211), the processing returns to the Operation S1202 and repeats the above processing.

As explained above, according to the document recognition apparatus and a method thereof, connected components of pixels are extracted from an input image. Then, based on the extracted connected components of pixels, the reference element and combined elements obtained by combining the reference element and the adjacent connected components of pixels are generated as elements to be estimated. Then a degree of certainty that indicates how much the generated elements to be estimated seem to be a character is calculated, and based on the calculated degree of certainty, elements that seem to be characters may be determined from the elements to be estimated. This allows an increase in variations of elements to be estimated, and thereby improves accuracy of recognition of elements that seem to be characters.

Elements to be estimated may be newly generated by combining connected components of pixels adjacent to the combined elements. This further increases variations of elements to be estimated, and thereby improves accuracy of recognition of an element that seems to be a character.

Then, an element to be estimated may be newly generated by combining connected components of pixels that are adjacent in either directions of right, lower, or lower right. This allows sequentially generating combined elements along a composition of a character, increases variations of elements to be estimated along the composition of the character, and thereby improves accuracy recognizing elements that seem to be characters.

Moreover, elements to be estimated may be generated up to a given number. Then, composition of one character corresponds to the given number of connected components of pixels. Processing time may be reduced by excluding elements to be estimated with composition larger than the given number.

Elements that seem to be characters may be determined among elements to be estimated with a degree of certainty "C" higher than or equal to a given threshold value. This improves accuracy of recognition of characters.

Then a degree of certainty is calculated for elements to be estimated in their order of generation. The last generated element to be estimated with a degree of certainty "C" higher than or equal to a given threshold value is determined to be an element that seems to be a character. Characters, particularly Chinese characters are comprised of combinations of components such as a radical that may independently be a Chinese character itself. Therefore, an element to be estimated that has the largest number of connected components of pixels is the last generated element to be estimated as long as it is within the given number of upper limit of connected components of pixels for one character. Thus, by prioritizing the last generated element to be estimated over the elements to be estimated generated before, accuracy of recognition of characters is improved.

Moreover, when there is no element to be estimated with a degree of certainty higher than or equal to a given threshold value, the element to be estimated is segmented into a plurality of rectangular areas, and combined elements may be generated as elements to be estimated based on the segmented rectangular areas. This prevents an error in recognition caused by a noise. Consequently, the document recognition apparatus, and a method thereof may improve accuracy of a line extraction in document recognition (extracting a group of connected components of pixels for each line).

The methods to recognize a document explained in this embodiment can be achieved by causing a computer such as a personal computer and a workstation to execute a prepared program. Such program is stored in a computer-readable storage medium such as a hard disk, a flexible disk, compact disc ROM (CD-ROM), magneto-optical (MO) disk, and digital versatile disk (DVD), and read and executed by a computer. The program may be transmission medium distributable through a network such as Internet.

All examples and conditional language recited herein are intended for pedagogical purpose to aid the reader in understanding the principles of the invention and the concepts contributed by the inventor to furthering the art, and are to be construed as being without limitation to such specifically recited examples and conditions, nor does the organization of such examples in the specification related to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A computer-readable non-transitory storage medium that stores a program causing a computer to function as a document recognition apparatus, the program causing said computer to execute a process comprising:
    extracting a group of connected components of pixels from an input image for each of a plurality of lines so that the elements that seem to be characters determined by said determining based on a histogram for a number of pixels obtained by projecting said connected components of pixels toward direction of a selected line identified by said group of connected components of pixels are enclosed,
    generating a reference element that is connected components of pixels extracted by said extracting and combined elements obtained by combining the reference element and connected components of pixels adjacent to the reference element as an element to be estimated;
    calculating a degree of certainty that indicates how much the element to be estimated generated by said generating seems to be a character; and
    determining elements that seem to be characters among said elements to be estimated based on the degree of certainty calculated by said calculation unit;
    wherein said generating newly generates said combined elements by combining connected components of pixels adjacent in directions of lower right of said elements to be estimated.

2. A computer-readable non-transitory storage medium that stores a document recognition program according to claim 1, wherein said generating newly generates combined elements by combining connected components of pixels adjacent to said combined element as said elements to be estimated.

3. A computer-readable non-transitory storage medium that stores a document recognition program according to claim 1, wherein said generating generates said elements to be estimated up to a given number.

4. A computer-readable non-transitory storage medium that stores a document recognition program according to claim 1, wherein said determining determines elements that seem to be characters among elements to be estimated with a degree of certainty higher than or equal to a given threshold value.

5. A computer-readable non-transitory storage medium that stores a document recognition program according to claim 4, wherein said calculating calculates said degree of certainty in order of generation of said elements to be estimated, and said determining determines elements to be estimated that were generated last among elements to be estimated with a degree of certainty higher than or equal to a given threshold value as said elements that seem to be characters.

6. A computer-readable non-transitory storage medium that stores a document recognition program according to claim 1, the process further comprising segmenting the elements to be estimated into a plurality of rectangular areas when there is no element to be estimated with a degree of certainty higher than or equal to a threshold value, said generating generates said combined elements as said elements to be estimated based on rectangular areas segmented by said segmenting.

7. A computer-readable non-transitory storage medium that stores a document recognition program according to claim 1, wherein said extracting extracts a group of connected components of pixels for each line so that elements that seem to be characters determined by said determining based on a degree of certainty of elements that seem to be characters are enclosed.

8. A document recognition apparatus, comprising:
    a processor; and
    a memory coupled to the processor, wherein the processor, based on a program stored in the memory, executes to:
    extract a group of connected components of pixels from an input image for each of a plurality of lines so that the elements that seem to be characters determined by said determining based on a histogram for a number of pixels obtained by projecting said connected components of pixels toward direction of a selected line identified by said group of connected components of pixels are enclosed,
    generate, based on a reference element that is connected components of pixels extracted by said extraction, the reference element and combined elements obtained by combining the reference element and adjacent connected components of pixels as elements to be estimated;
    calculate a degree of certainty that indicates how much the elements to be estimated generated by said generation seem to be a character; and
    determine elements that seem to be characters among said elements to be estimated based on the degree of certainty calculated by said calculation;
    wherein the processor executes to newly generate said combined elements by combining connected components of pixels adjacent in directions of lower right of said elements to be estimated.

9. A document recognition method executed by a computer comprising;
    extracting a group of connected components of pixels from an input image for each of a plurality of lines so that the elements that seem to be characters determined by said determining based on a histogram for a number of pixels obtained by projecting said connected components of pixels toward direction of a selected line identified by said group of connected components of pixels are enclosed, generating, based on a reference element that is connected components of pixels extracted, the reference element and combined elements obtained by combining the reference element and adjacent connected components of pixels, as elements to be estimated;

calculating a degree of certainty that indicates how much the elements to be estimated generated seem to be a character; and determining elements that seem to be characters among said elements to be estimated, based on the degree of certainty calculated;

wherein said combined elements are newly generated by combining connected components of pixels adjacent in directions of lower right of said elements to be estimated.

* * * * *